US006587951B1

(12) United States Patent
Flanigan (10) Patent No.: US 6,587,951 B1
(45) Date of Patent: Jul. 1, 2003

(54) METHOD OF POWERING DOWN A COMPUTER SYSTEM BY PERFORMING AN UNCONDITIONAL SHUTDOWN AFTER INTERRUPTS OF FIRST AND SECOND SOFTWARE SYSTEMS RESPECTIVELY FAIL FOLLOWING A POWER BUTTON EVENT

(75) Inventor: Edward P. Flanigan, Burbank, SD (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/471,839

(22) Filed: Dec. 23, 1999

(51) Int. Cl.[7] .............................. G06F 1/26; G06F 1/28; G06F 1/30; G06F 11/30
(52) U.S. Cl. .................... 713/310; 713/300; 713/324; 713/330; 713/340
(58) Field of Search ................... 713/300, 324, 713/330, 340, 310

(56) References Cited

U.S. PATENT DOCUMENTS 5,790,833 A * 8/1998 Gulick et al. ................. 703/28
5,826,015 A * 10/1998 Schmidt ...................... 713/200
5,918,059 A * 6/1999 Tavallaei et al. ............. 713/320
6,115,824 A * 9/2000 Ha .............................. 713/300

OTHER PUBLICATIONS

Controlled Shut Down Function on Banking Self Serivce, Mar. 1, 1996, IBM Technical Disclosure, No. NN9603245, vol. 39, Iss. No. 3, pp. 245–246.*

* cited by examiner

Primary Examiner—Thomas Lee
Assistant Examiner—James K. Trujillo
(74) Attorney, Agent, or Firm—Scott Charles Richardson; Rodney L. Lacy; Schwegman-Lundberg Woessner-Kluth (57) ABSTRACT

A method for powering down a computer system is shown. A power button is actuated and an interrupt is generated in response to the actuation of the power button. An unconditional shutdown of the computer system is performed on system software failing to respond to the interrupt. The system software powers down the computer system on the system software responding to the interrupt.

28 Claims, 8 Drawing Sheets

METHOD OF POWERING DOWN A COMPUTER SYSTEM BY PERFORMING AN UNCONDITIONAL SHUTDOWN AFTER INTERRUPTS OF FIRST AND SECOND SOFTWARE SYSTEMS RESPECTIVELY FAIL FOLLOWING A POWER BUTTON EVENT

FIELD

The present invention relates generally to power control for computers, and more specifically to an automatic power button override for computers.

BACKGROUND

The power button on computers is a familiar feature. One of the tasks the power button performs is powering down a computer. However, computers are complex devices and can not be turned on and off like a light bulb without the possibility of damaging the computer. Computers run various processes and operations that can lose data or damage system files if they are abruptly terminated. Consequently, powering down a computer is a more complicated process than simply turning off a light bulb or other switch. For example, a cache temporarily stores data before it is written to a drive or system memory. Data cached in volatile memory is lost when the computer is powered off. If a cache is powered down prematurely, critical data may be lost.

Computers may contain power management controllers that allow the user to safely power down a computer. Power management controllers react to power button input by generating a system interrupt. The system interrupt may trigger an operating system (OS) based power management controller or a basic input/output system (BIOS) power management controller to handle the power button push event. The system software (BIOS or OS based power management handler) can then handle the power button push event according to its overall power management policies. Some system software could initiate a controlled system shut down or a transition to a sleep state. This software may power down the computer or it may force the computer system to progress to a shut down state in which the power can be turned off without damaging the computer or losing data. Generally, this software permits caches and other processes to finish critical operations before the system is powered down. However, in many cases, such power management controllers are not used and a user can still just hit the power switch to power down the system. Furthermore, the system software may halt or fail to respond to the event which can result in a hard locked state. When a system is in a hard locked state, the system fails to respond to a power button push. The user experiences a computer system that will not shut down.

A way to avoid a user inadvertently or damagingly shutting down the file system or file structure with the power button while avoiding a computer system that will not shut down is to utilize an override mechanism for the power button. The override mechanism generally requires a user to hold the power button for 4 seconds to force a unconditional system shut down. This can permit a user to shut down a locked computer system.

The override mechanism presents a number of problems. Many users are not aware of the override mechanism and are unable to initiate a shut down of their computers if their computers are locked. Furthermore, users do not expect or appreciate a response time of 4 seconds. Users generally expect an immediate or near immediate response. Additionally, users who are unaware of the override mechanism often resort to potentially more destructive methods of powering down their system such as unplugging the computer system from its power source.

Therefore, there is a need in the art for a user friendly mechanism that allows shutting down of computer systems even if they are locked and which prevents inadvertent shut downs.

SUMMARY

In one embodiment, a method for powering down a computer system is disclosed in which the computer power button is actuated, generating an interrupt. An unconditional shut down is performed if system software fails to respond to the interrupt. On the system software responding to the interrupt, the system software powers down the computer system.

In another embodiment, a computer system with a power button override is disclosed. The computer includes a power button, an automatic override mechanism coupled to the power button, a power handler coupled to the power button and the automatic override mechanism and a computer coupled to the power handler and the automatic override mechanism. The power button generates a power button event when actuated. The power handler handles the power button event. The automatic override mechanism shuts down the computer on the power handler malfunctioning.

Other embodiments are described and claimed.

DESCRIPTION OF EMBODIMENTS

In the following detailed description of embodiments, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and logical, structural, electrical, and other changes may be made without departing from the scope of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A computer basic input/output system (BIOS) is built-in software that is run initially on startup of the computer. The BIOS contains all the code required to control the peripheral devices of the computer, such as keyboard, display screen, disk drives, serial communications, and the like.

The BIOS is typically stored on a read only memory (ROM) chip. Since it is stored on a dedicated chip, the BIOS is protected from many disk and memory failures. The BIOS allows the computer to boot itself. On startup, the BIOS is often copied into computer random access memory (RAM) because RAM operates faster than ROM.

Figure 1:
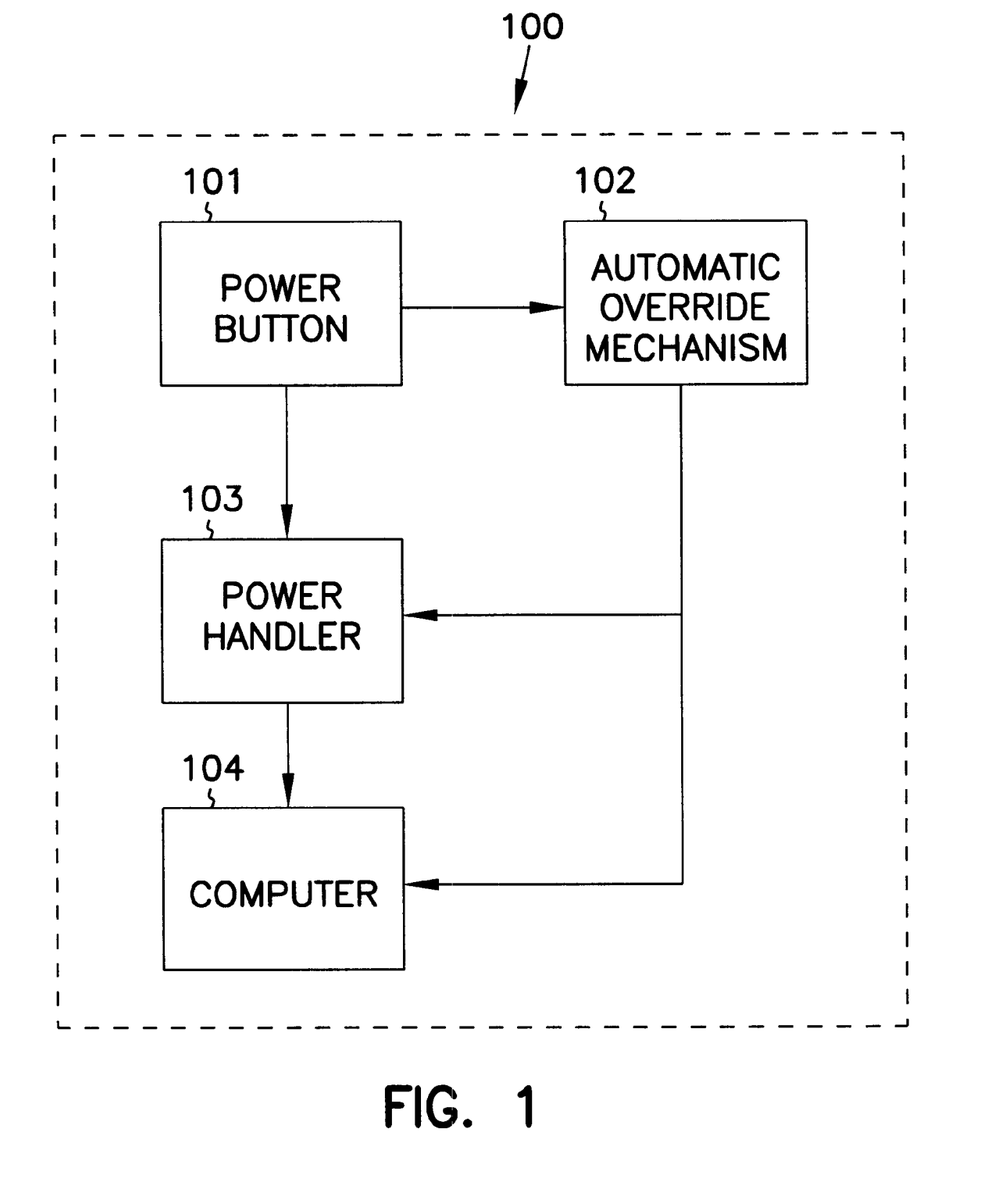
FIG. 1 is a block diagram of a computer system with a power button override according to one embodiment of the present invention.

FIG. 1 shows a computer system 100 having a power button override according to one embodiment of the invention. The system includes a power button 101, an automatic override mechanism 102, a power handler 103 and a computer 104. The power button, automatic override mechanism and the power handle are in one embodiment built in to the system, although the invention is not so limited. The automatic override mechanism 102 is coupled to the power button 101. The automatic override mechanism can be implemented any number of ways such as by electrical components, software, or the like. The automatic override mechanism 102 includes an override counter. The power handler 103 is coupled to the power button 101 and the automatic override mechanism 102. For this embodiment, the power handler 103 is an operating system handler or a BIOS handler. The computer system 104 is coupled to the power handler 103 and the automatic override mechanism 102. The computer 104 includes components such as a processor, memory and a power supply.

The power button 101 generates a power button push event when actuated. If the computer 104 is on when the power button is actuated, the power button push event is a power off event.

The automatic override mechanism 102 receives the power off event generated by the power button 101. The automatic override mechanism 102 passes the power off event to the power handler 103 and starts the override counter. The override counter is set to count until a predetermined time period has elapsed. The predetermined time period is generally in the range of milliseconds for this embodiment, however other embodiments of the invention may use different ranges. If the counter reaches the predetermined time period without receiving a response from the power management controller 103, the automatic override mechanism shuts the computer 104 down by performing an unconditional shut down. If a response is received from the power handler 103 prior to the override counter reaching the predetermined time period, the automatic override mechanism 102 does not shut the computer 104 down and leaves the power off event handling to the power handler 103.

The power handler 103 is coupled to the automatic override mechanism 102 and the computer 104. For this embodiment, the power handler 103 may be an operating system handler or a BIOS handler. The power handler 103 handles the power off event according to its power management policies. For example, the power management policies may cause the power handler 103 to allow certain processes to complete before initiating a shut down or may not allow a shut down at all. The power management policies may be predetermined, set by a user or dynamically determined by the power handler 103.

The computer 104 is coupled to the power handler 103 and the automatic override mechanism 102. The power button 101, the automatic override mechanism 102 and the power handler 103 physically reside in the computer 104 in one embodiment. The computer 104 includes such components as a processor, memory and power supply. One example of a way to shut down the computer system is by de-asserting a power on signal to the power supply.

Figure 2:
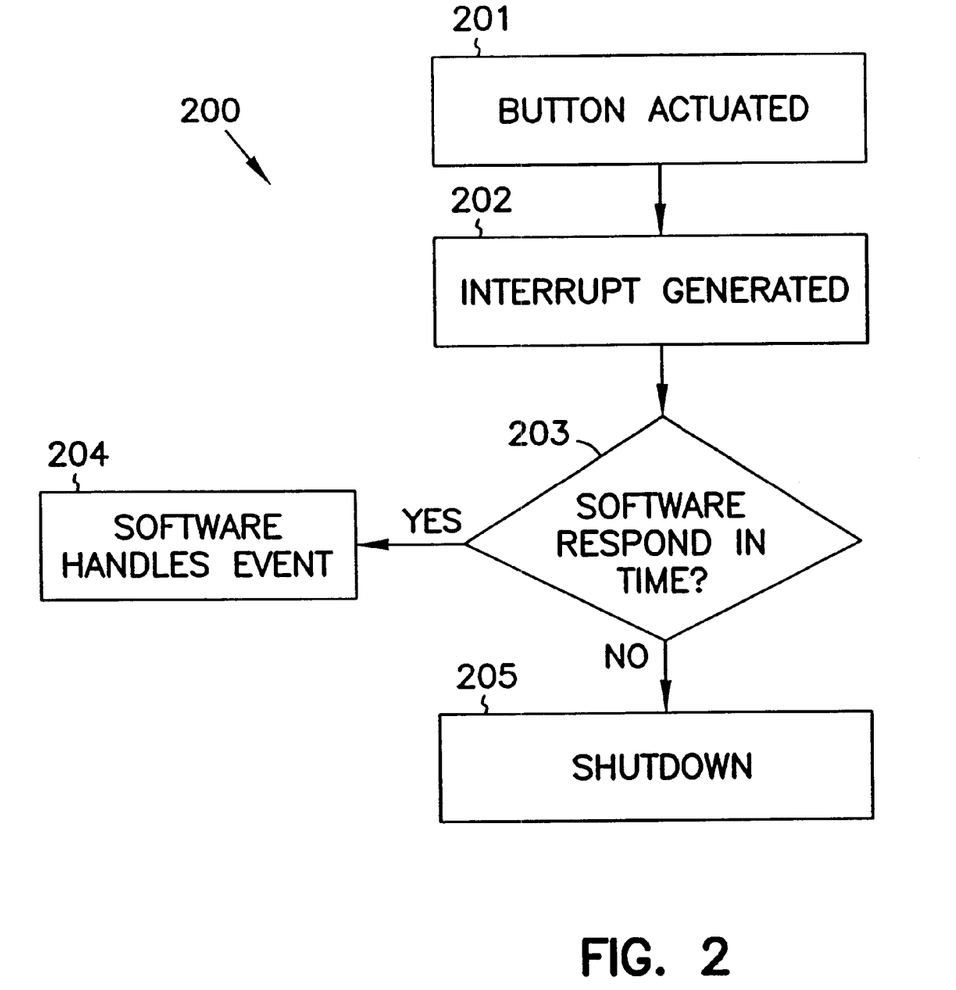
FIG. 2 is a flow chart diagram of a method for powering down a computer system according to one embodiment of the present invention.

FIG. 2 is a flowchart of one embodiment of a method 200 for powering down a computer system. While a computer is in a powered up and operational or apparently locked state, a power management controller reacts to a power button input 201 by generating a system interrupt 202.

The system interrupt is received by system software. The system software is required to respond to the system interrupt within a predetermined amount of time. If the system software responds to the system interrupt within a certain amount of time as determined in decision block 203, the system software handles the power button event 204. The system software may handle the power button event by permitting the computer system to shut down or by disallowing the shut down request. The system software handles the power button event according to a power management policy.

If the system software fails to respond to the system interrupt within the certain amount of time 203, the system software is determined to be locked. Locked software is software that fails to respond and may be non-operational. If the system software is locked, as determined by the failure to respond, the computer system is unconditionally shut down in block 205. The computer system may be shut down by signaling a power supply to unconditionally shut down or some other suitable shut down procedure.

Figure 3:
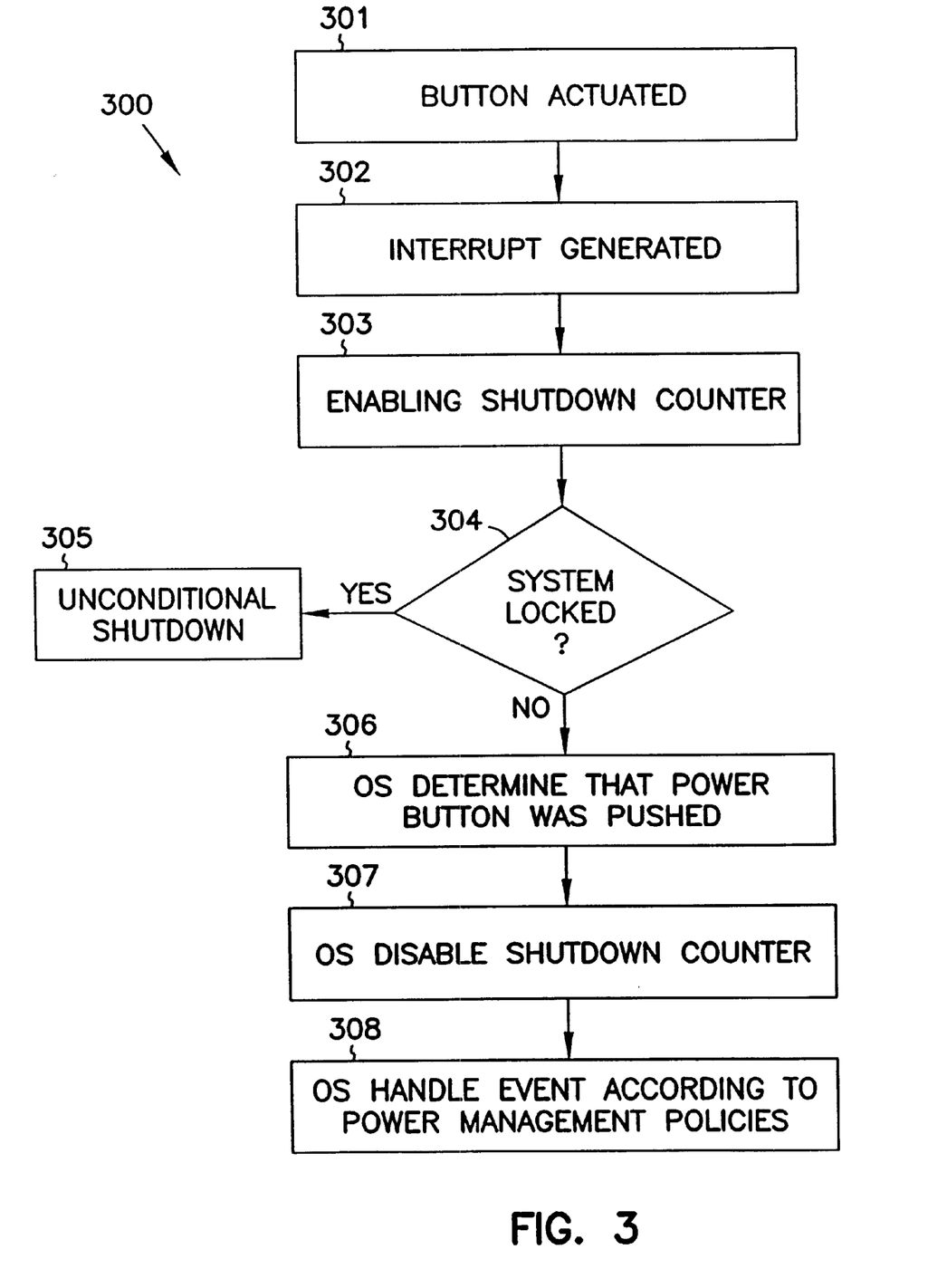
FIG. 3 is a flow chart of a method for powering down a computer system according to another embodiment of the present invention.

FIG. 3 is a flowchart of another embodiment of a method 300 for powering down a computer system. While a computer is in a powered up and operational or apparently locked state, a power management controller reacts to a power button input 301 by generating an operating system interrupt 302. Additionally, a shut down counter is enabled 303. A shut down counter is a counter that starts counting when enabled and generally counts until a predetermined time period.

The system interrupt is received by the operating system. The operating system is required to respond to the interrupt before the shut down counter reaches a predetermined time period. If the operating system fails to respond to the system interrupt within the predetermined time period, it is determined that the operating system is locked and may be malfunctioning. If the operating system responds to the interrupt prior to the counter reaching the predetermined time period, the operating system is determined to be operating normally and is not locked. The predetermined time may vary from implementation to implementation without departing from the scope of the invention.

If the operating system is locked as determined by decision block 304, an unconditional shut down of the computer system is performed 305. If the operating system is not locked or is operating normally as determined by decision block 304, the operating system begins handling the power button event. The operating system verifies that the power button was actuated 306. This prevents the operating system from shutting down the computer system because of an erroneous interrupt. The operating system disables the shut down counter 307. The operating system, in one embodiment, resets the counter to a zero value. The operating system software handles the power button event according to power management policies 308. The power management policies may, for example, require the operating system to wait for certain processes to complete execution before shutting down the computer system or disallowing the shut down.

Figure 4:
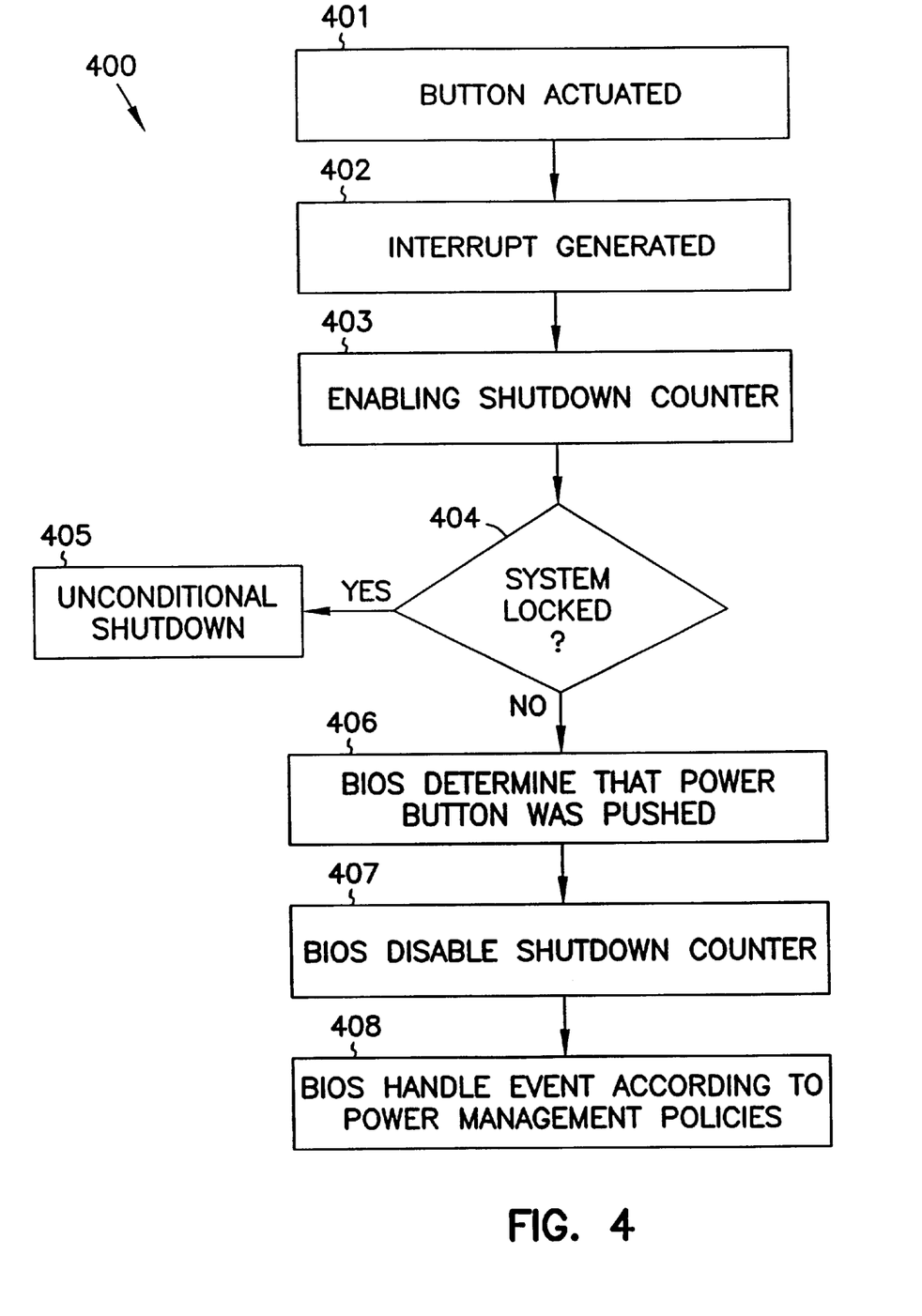
FIG. 4 is a flow chart of a method for powering down a computer system according to still another embodiment of the present invention.

FIG. 4 is a flowchart of another embodiment of a method 400 for powering down a computer system. A system interrupt is generated 402 in response to a power button being actuated 401 while the computer system is in a powered up and operational state or apparently locked. A shut down counter is enabled 403 to start counting while awaiting a response from the system BIOS to indicate that the system is operating normally. Generally, the counter is set to count until a predetermined time has elapsed. If an appropriate response to the system interrupt has not been received from the BIOS by the time the counter reaches the predetermined time, it is assumed that the BIOS is malfunctioning and is locked. If a response to the interrupt is received prior to the counter reaching the predetermined time, it is assumed that the BIOS is operational and is not locked. The predetermined time may vary by implementation and may be set by a user.

If the BIOS is locked 404, an unconditional shut down of the computer system is performed 405. If the BIOS is not locked or is operating normally 404, the BIOS begins handling the power button event. The BIOS determines or checks that the power button was actuated 406. This prevents the BIOS from shutting down the computer system because of an erroneous interrupt. The BIOS disables the shut down counter 407. In one embodiment, the BIOS disables the counter. The BIOS software handles the power button event according to power management policies 408. The power management policies may, for example, require the BIOS to wait for certain processes to complete execution before shutting down the computer system or disallowing the shut down.

Figure 5A:
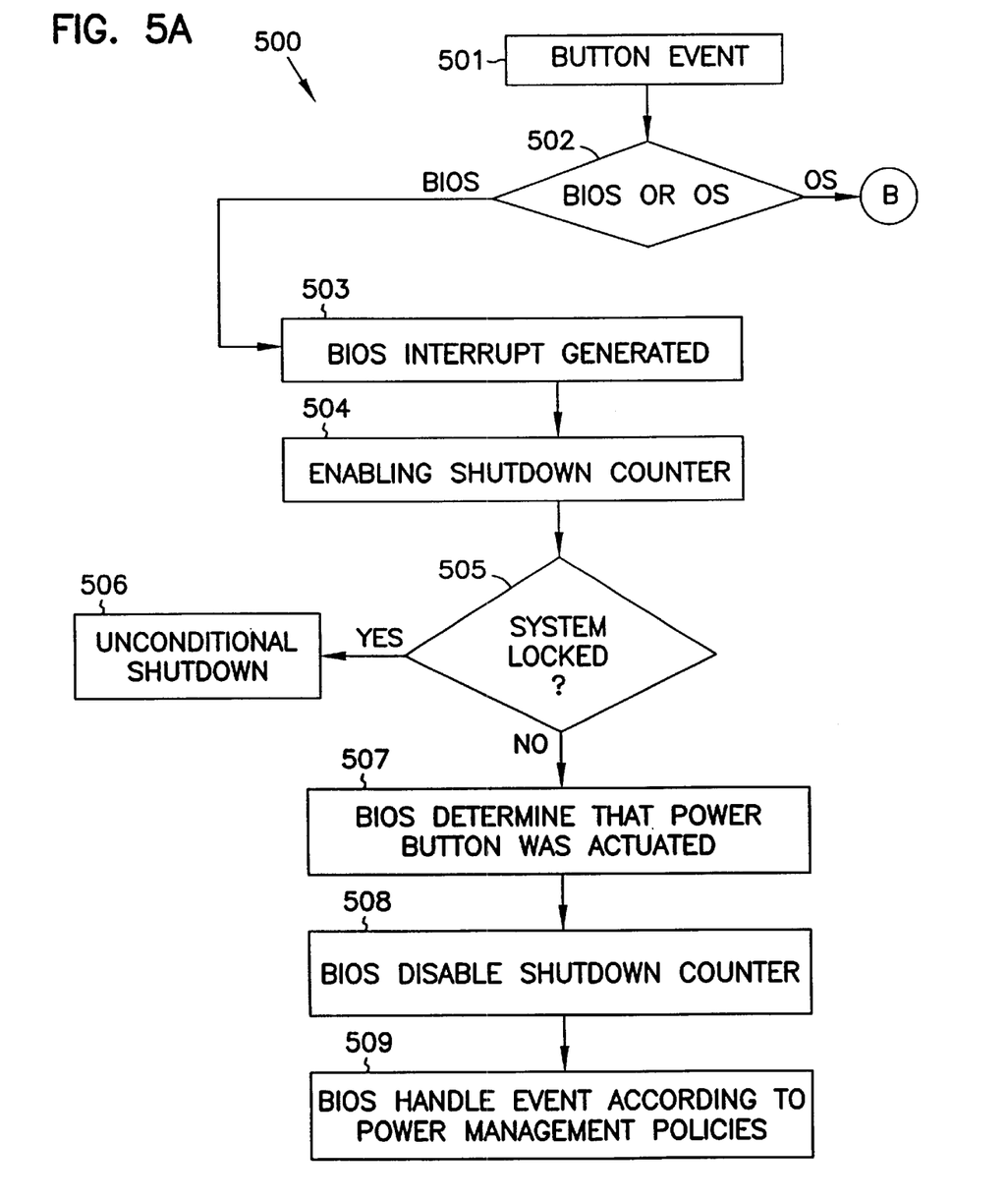
FIGS. 5A and 5B are a flow chart of a method for powering down a computer system according to still another embodiment of the present invention.
Figure 5B:
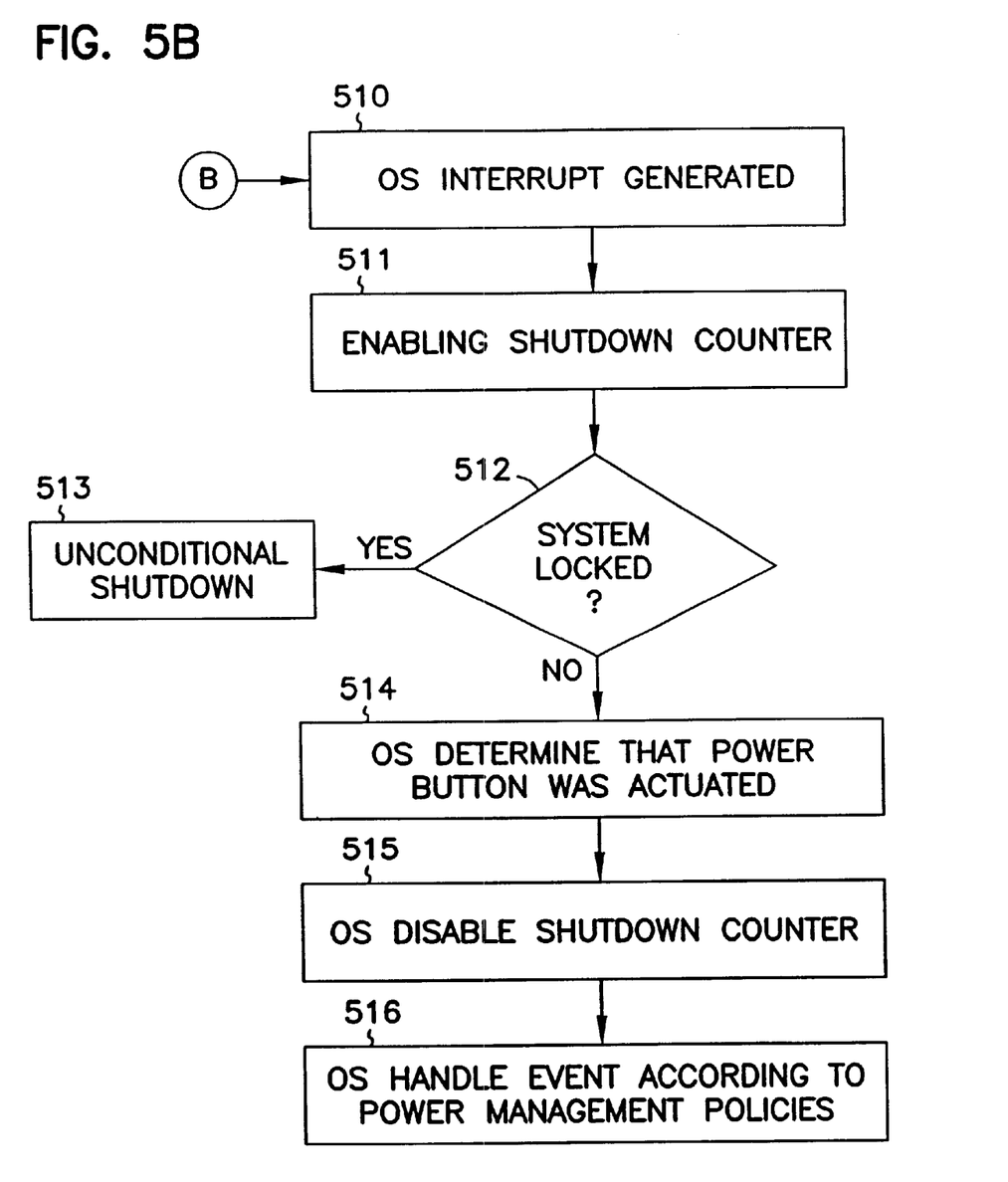

FIGS. 5A and 5B are a flowchart diagrams of another embodiment of a method 500 of powering down a computer system. A power button event occurs when a power button is actuated while a computer system is on and is operating normally or is apparently locked 501. If the computer system is configured to handle power button events through the BIOS as determined in block 502, a BIOS interrupt is generated at 503. If the computer system is configured to handle power button events through the operating system as determined in block 502, an operating system interrupt is generated at 510. To determine whether the BIOS or operating system is to handle power button events, a system control bit is used in one embodiment. For example, if the system control bit is set then the operating system handles power button events and if the system control bit is not set, the BIOS handles power button events. It should be understood that alternate embodiments using other mechanisms or methods to determine whether the BIOS or operating system handles the power button event may be employed without departing from the scope of the invention.

If the BIOS is handling power button events, process flow continues at 503. The BIOS interrupt generated at 503 is also known as a system management interrupt (SMI). A BIOS shut down counter is enabled at 504 and is set to count to a predetermined time limit. If the BIOS shut down counter reaches the first time limit without receiving a response indicative of a system operating normally, it is determined that the BIOS is locked or malfunctioning. If the BIOS responds to the BIOS interrupt prior to the shut down counter reaching the first time period, it is assumed that the BIOS is operating normally and is not locked. If the BIOS is locked as determined in block 505, an unconditional shut down is performed 506. In one embodiment, the BIOS verifies that the power button was in fact actuated and that the BIOS interrupt was not erroneous 507. The bios can verify that the power button was actuated by a number of ways such as querying a user response or verifying the BIOS interrupt. The BIOS disables the BIOS shut down counter at 508, and handles the power button event according to power management policies at 509. The power management policies may, for example, require the BIOS to wait for certain processes to complete execution before shutting down the computer system or disallowing the shut down.

As stated earlier, if the computer system is configured to handle power button events through the operating system, an interrupt is generated at 510. The interrupt in various embodiments includes but is not limited to an operating system interrupt, a system control interrupt, or the like. Additionally, an operating system shut down counter is enabled and is set to a second predetermined time limit at 511. The second time limit may vary from implementation to implementation and may be the same as or different from the first time limit. The operating system is required to respond to the interrupt prior to the operating system shut down counter reaching the second time limit. If the operating system fails to respond to the system interrupt within the second time period, it is determined at block 512 that the operating system is locked and may be malfunctioning. If the operating system responds to the interrupt before the counter reaches the second time period, the operating system is determined to be operating normally and is not locked.

If the operating system is locked as determined at block 512, an unconditional shut down of the computer system is performed at 513. If the operating system is not locked or is operating normally, the operating system begins handling the power button event. The operating system verifies that the power button was actuated at 514 to prevents the operating system from unintentionally or undesirably shutting down the computer system. The operating system can verify that the power button was actuated any number of ways such as querying a user. The operating system disables the shut down counter at 515 and may also reset the counter. The operating system software handles the power button event according to power management policies 516. The power management policies may, for example, require the operating system to wait for certain processes to complete execution before shutting down the computer system or disallowing the shut down.

Figure 6:
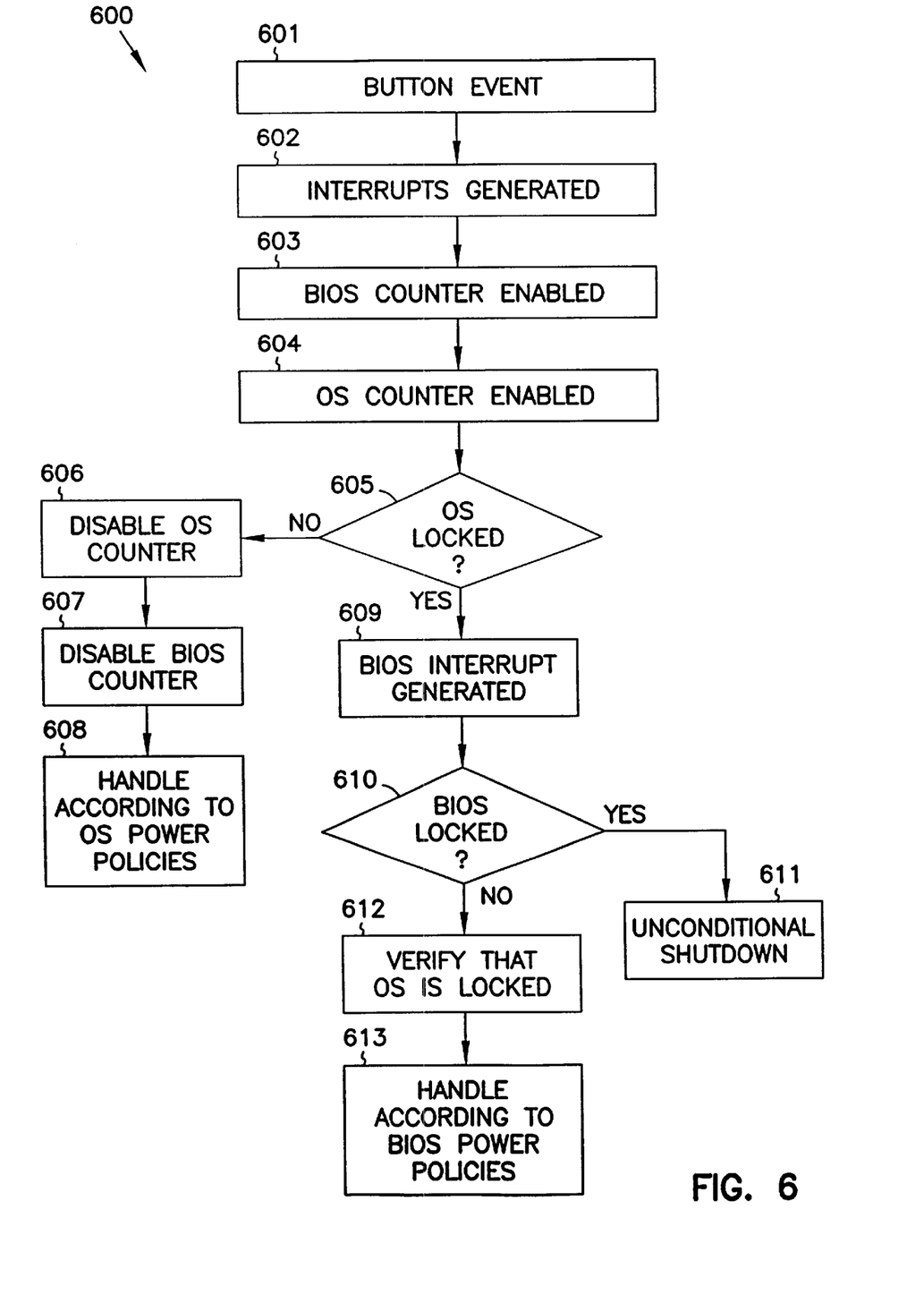
FIG. 6 is a flow chart of a method for powering down a computer system according to still another embodiment of the present invention.

FIG. 6 is a flowchart of another embodiment of a method for powering down a computer system. A power button event 601 occurs when a power button is actuated while the computer system is operational. In response to the power button event, an interrupt is generated at 602. The interrupt in various embodiments includes but is not limited to an operating system interrupt, a system control interrupt, or the like. A BIOS counter is enabled at 603. The BIOS counter is set to count to a first value. An operating system counter is enabled at 604. The operating system counter counts to a second value. If the operating system counter reaches the second value before an appropriate response signal is received from the operating system, it is determined that the operating system has malfunctioned and is locked. If the operating system responds to the operating system interrupt prior to the operating system counter reaching the second value, the operating system is determined to be operational and not locked. In one embodiment, the second value is less than the first value so that a locked operating system can be detected before a locked BIOS can be detected. In an alternate embodiment, the second value is greater than the first value so that a locked BIOS can be detected prior to detecting a locked operating system.

If the operating system is not locked as determined at block 605, the operating system begins handling the power button event. The operating system counter is disabled at 606. The BIOS counter is disabled at 607. The operating system handles the power button event according to operating system power management policies.

If the operating system is locked as determined at decision block 605, a BIOS interrupt is generated at 609. The BIOS interrupt is also known as a system management interrupt (SMI). If the BIOS counter reaches the first value without receiving an appropriate response from the BIOS, it is determined at 610 that the BIOS has malfunctioned and is locked. If a response to the BIOS interrupt is received prior to the BIOS counter reaching the first value, it is determined that the BIOS is operational and not locked.

If the BIOS is locked as determined at block 610, an unconditional shut down of the computer system is performed at 611. If the BIOS is not locked or is operating normally, the BIOS begins handling the power button event. The BIOS checks or verifies that the operating system is in fact locked at 612. The BIOS may pass handling of the power button event to the operating system if the BIOS finds that the operating system is operating. This permits the operating system to still handle the power button event when the operating system is operating normally, but for some reason failed to respond to the operating system interrupt in time. The operating system then handles the power button event according to operating system power management policies. The operating system power management policies may be different than the BIOS power management policies.

In an alternate method, a user may hold a power button in for a set length of time to force an unconditional shut down in the event that the method described in FIG. 6 fails to initiate a desired shut down of the computer system.

Figure 7:
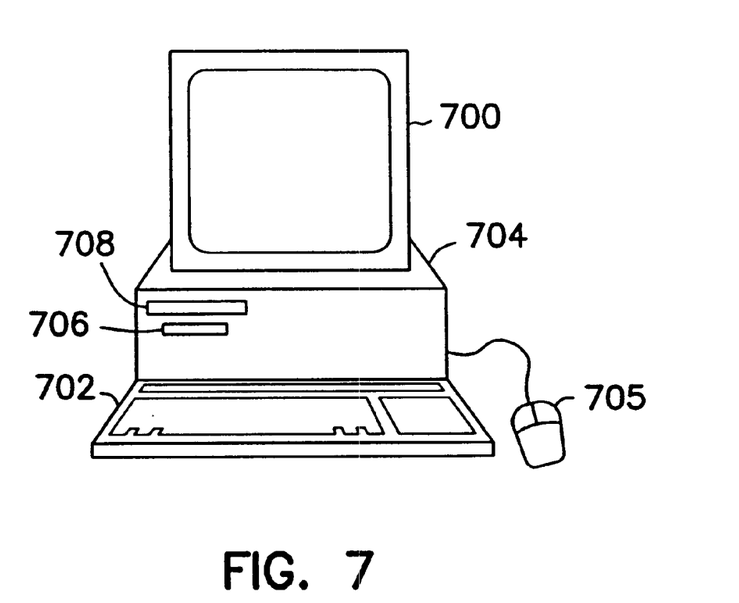
FIG. 7 is a diagram of a typical desktop computer with which embodiments of the invention may be implemented.
Figure 8:
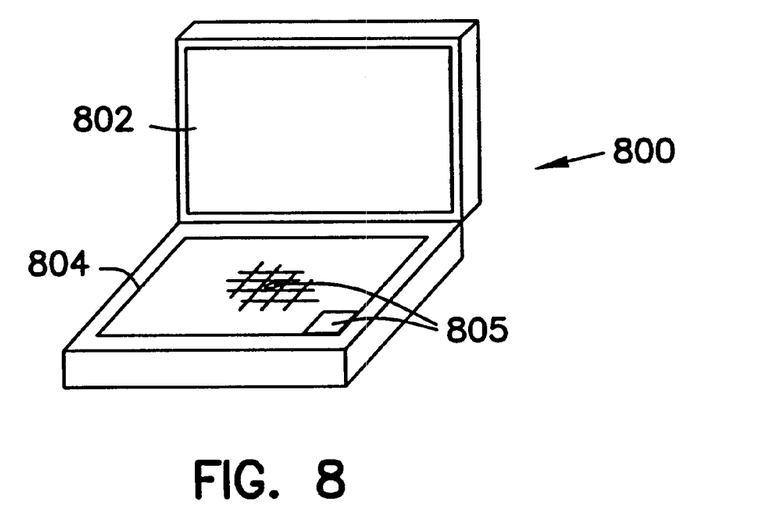
FIG. 8 is a diagram of a typical portable or laptop computer with which embodiments of the invention may be implemented.

Desktop computers, as shown in FIG. 7, typically include a monitor 700, keyboard input 702, central processing unit 704, and a pointing or selection device such as mouse 705. Further components of a typical computer system may include a machine readable storage media such as disk drive 706, hard disk, CD-ROM 708, DVD, modem, and the like. The processor unit of such a computer typically includes a microprocessor, memory (RAM and ROM), and other peripheral circuitry, not shown. Portable or laptop computers, as shown in FIG. 8 include the same features in general as desktop computers, but are smaller, and often comprise a single unit 800 with integrated display screen 802 and keyboard 804, and pointing device 805 such as a touch pad or trackball. Such computers are some of the types of host devices on which embodiments of the present invention may be employed.

Methods 200, 300, 400, 500 and 600, system 100 and variations thereof may be used in the computer systems shown in FIG. 7 or 8. Methods 200, 300, 400, 500 and 600, system 100 and variations thereof may be implemented partially or wholly in computer programs. The computer programs run on the central processing unit 704 out of main memory, and may be transferred to main memory from permanent storage via disk drive 706 when stored on removable media or via a network connection or modem connection when stored outside of the personal computer, or via other types of computer or machine readable medium from which it can be read and utilized. The computer programs comprise multiple modules or objects to perform the methods 200, 300, 400, 500, 600 or the functions of modules in system 100. The type of computer programming languages used to write the code may vary between procedural code type languages to object oriented languages. The files or objects need not have a one to one correspondence to the modules or method steps described depending on the desires of the programmer. Further, the method and apparatus may comprise combinations of software, hardware and firmware as is well known to those skilled in the art.

The various embodiments allow a user friendly and flexible way to handle shutting down or powering down a computer system. Additionally, unnecessary loss of data and possible computer system damage may be avoided by allowing the computer system to shut down appropriately instead of a forced shut down.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

What is claimed is:

1. A method for powering down a computer system comprising:
   actuating a power button;
   generating a first interrupt and a second interrupt in response to the actuation of the power button;
   powering down the computer system by the first system software in response to the first system software responding to the first interrupt;
   powering down the computer system by the second system software-in response to the first system software failing to respond to the first interrupt and the second system software responding to the second interrupt; and
   performing an unconditional shut down after first system software and second system software have failed to respond to the first and second interrupts, respectively.

2. The method of claim 1, wherein performing the unconditional shut down comprises de-asserting a signal to a power supply.

3. The method of claim 1, wherein handling the first interrupt by the first system software comprises handling the first interrupt according to a power management policy.

4. The method of claim 1, wherein the first system software is an operating system.

5. The method of claim 1, wherein the first system software is a basic input output system.

6. The method of claim 1 further comprising enabling a counter and requiring first system software to respond before the counter reaches a first value.

7. The method of claim 1, further comprising:
performing the unconditional shut down on the system software failing to respond to the interrupt within a predetermined time period, wherein the predetermined time period is shorter than a time required to power down the computer system.

8. The method of claim 7, further comprising a step of verifying the actuating of the power button, wherein the verifying step occurs after the system software response to the interrupt and before the powering down of the computer system.

9. The method of claim 1, wherein the second interrupt is generated before the first system software has failed to respond to the first interrupt.

10. The method of claim 9, wherein the second interrupt is a bios interrupt.

11. The method of claim 1, wherein the second interrupt is a non-maskable interrupt.

12. A method for powering down a computer system, comprising:
generating an interrupt on a power button input;
enabling a shut down counter;
shutting down a computer system on an operating system failing to respond to the interrupt prior to the counter reaching a predetermined limit and if a BIOS is locked;
handling the power button input by the operating system on the operating system responding before the counter reaches the predetermined limit; and
handling the power button input by the BIOS if the operating system fails to respond to the interrupt prior to the counter reaching the predetermined limit and if the BIOS is not locked.

13. The method of claim 12, wherein handling the power button input by the operating system comprises:
verifying the power button input;
disabling the shut down counter; and
handling the power button input according to operating system power management policies.

14. The method of claim 13, wherein handling the power button input according to operating system management policies comprises waiting until critical processes have finished processing before shutting down the computer system.

15. The method of claim 12, wherein shutting down a computer system comprises signaling a power supply to unconditionally shut down.

16. The method of claim 12, wherein the shut down counter counts to a first value and the first value is set by the operating system.

17. A method for powering down a computer system comprising:

generating a power button event;
generating an interrupt in response to the power button event;
determining whether the computer system is set to initially handle power button events through a basic input output system (BIOS) or an operating system;
initially handling power button events by the BIOS if the BIOS is set to initially handle power button events;
handling power button events by the BIOS if the operating system is set to initially handle power button events and the operating system is hung; and
initially handling power button events by the operating system if the operating system is set to initially handle power button events.

18. The method of claim 17, wherein said interrupt is a BIOS interrupt and wherein handling power button events by the BIOS comprises:
generating the BIOS interrupt in response to the power button event;
enabling a BIOS shut down counter;
on the BIOS responding to the BIOS interrupt prior to the BIOS shut down counter reaching a first value, performing the following:
disabling the BIOS shut down counter;
verifying the power button event; and
handling the power button event according to BIOS power management policies; and
on the BIOS failing to respond to the BIOS interrupt prior to the BIOS counter reaching the first value, unconditionally powering down the computer system.

19. The method of claim 17, wherein said interrupt is an operating system interrupt and wherein handling power button events by the operating system comprises:
generating an operating system interrupt in response to the power button event;
enabling an operating system shut down counter;
on the operating system failing to respond to the operating system interrupt prior to the operating system shut down counter reaching a second value, unconditionally powering down the computer system; and
on the operating system responding to the operating system interrupt prior to the operating system shut down counter reaching the second value, performing the following:
disabling the operating system shut down counter;
verifying the power button event; and
handling the power button event according to operating system power management policies.

20. The method of claim 17, further comprising, selecting one of the BIOS and the operating system to initially handle power button events.

21. The method of claim 17, further comprising performing an unconditional shut down of the computer system if the BIOS is hung and the operating system is hung.

22. The method of claim 17, wherein the interrupt is a non-maskable interrupt.

23. A method of powering down a computer system comprising:
receiving a power button input;
on a first system software layer being locked, handling the power button input by a second system software layer according to second power management policies;
on the second system software layer being locked, handling the power button input by the first system software layer according to first power management policies; and performing an unconditional shut down of the computer system on the first system software layer and the second system software layer being locked.

24. The method of claim 23, wherein the first system software layer is an operating system and the second system software layer is a basic input output system (BIOS).

25. The method of claim 23, wherein the first system software layer is a first operating system layer and the second system software layer is a second operating system layer.

26. A method of powering down a computer system comprising:

generating a power button event;

generating an operating system interrupt in response to the power button event;

enabling a basic input output system (BIOS) counter;

determining if the operating system is operational;

handling the power button event according to operating system policies if the operating system is operational;

determining if the BIOS is locked on the operating system being locked;

performing an unconditional shut down of the computer system if the BIOS is locked and the operating system is locked;

handling the power button event according to BIOS system policies if the BIOS is operational.

27. The method of claim 26, wherein handling the power button event according to operating system policies further comprises:

disabling the BIOS counter;

disabling the operating system counter; and verifying the power button event.

28. The method of claim 26, wherein handling the power button event according to BIOS system policies further comprises:

disabling the operating system counter;

disabling the BIOS counter; and verifying the power button event.

* * * * *